H. G. TISSOT.
TAGGING MACHINE.
APPLICATION FILED MAR. 10, 1913.
1,207,818.
Patented Dec. 12, 1916.
10 SHEETS—SHEET 7.
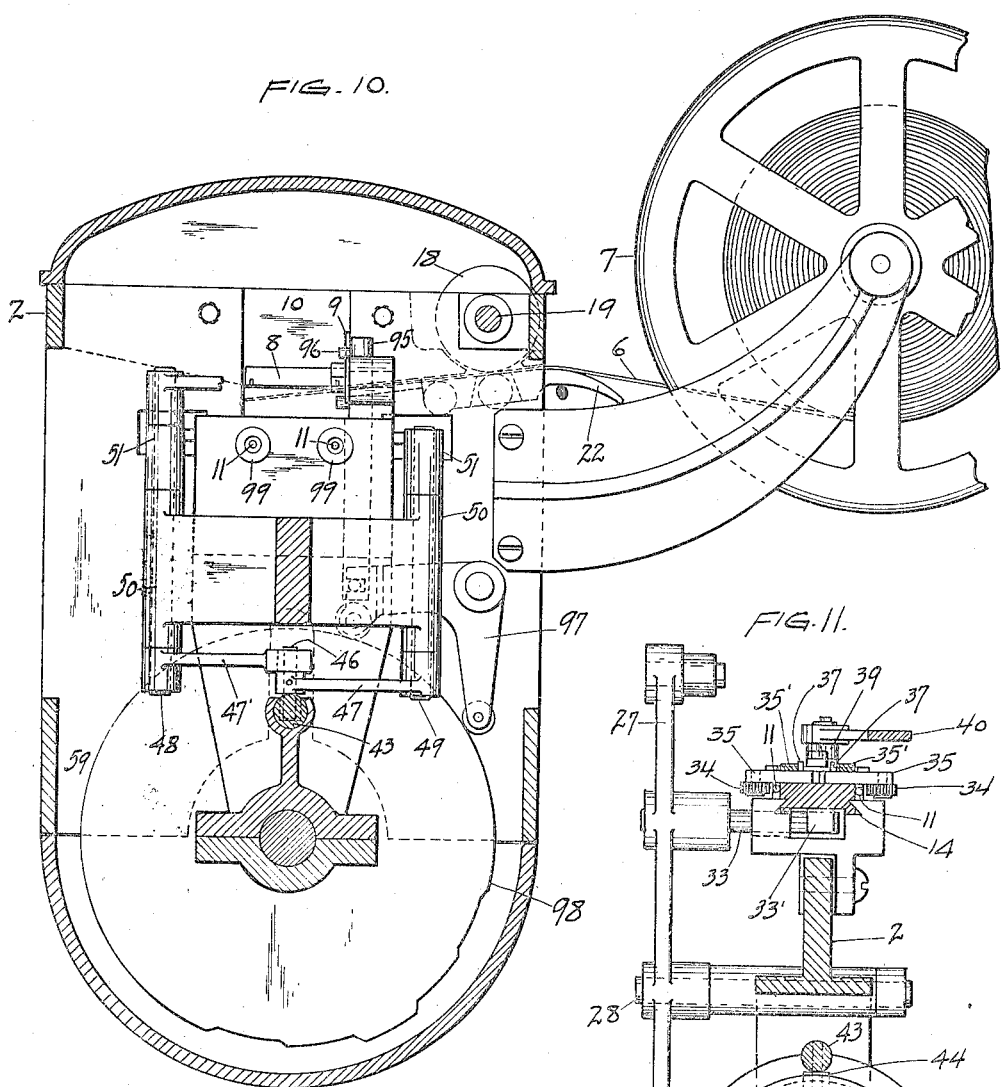
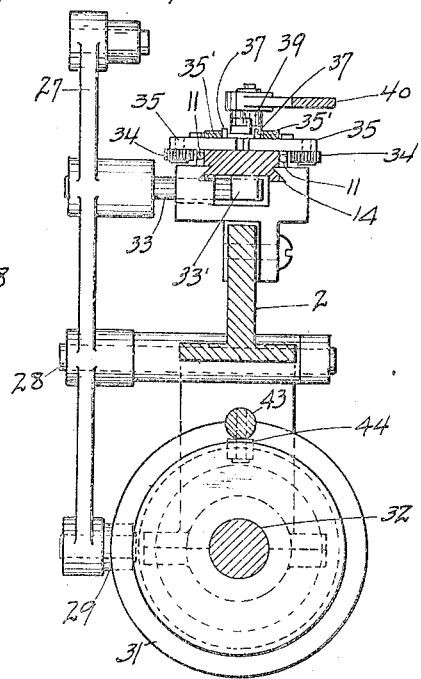
ATTESTS:
INVENTOR
Harry G. Tissot
BY Fisher & Moser
ATTY'S.

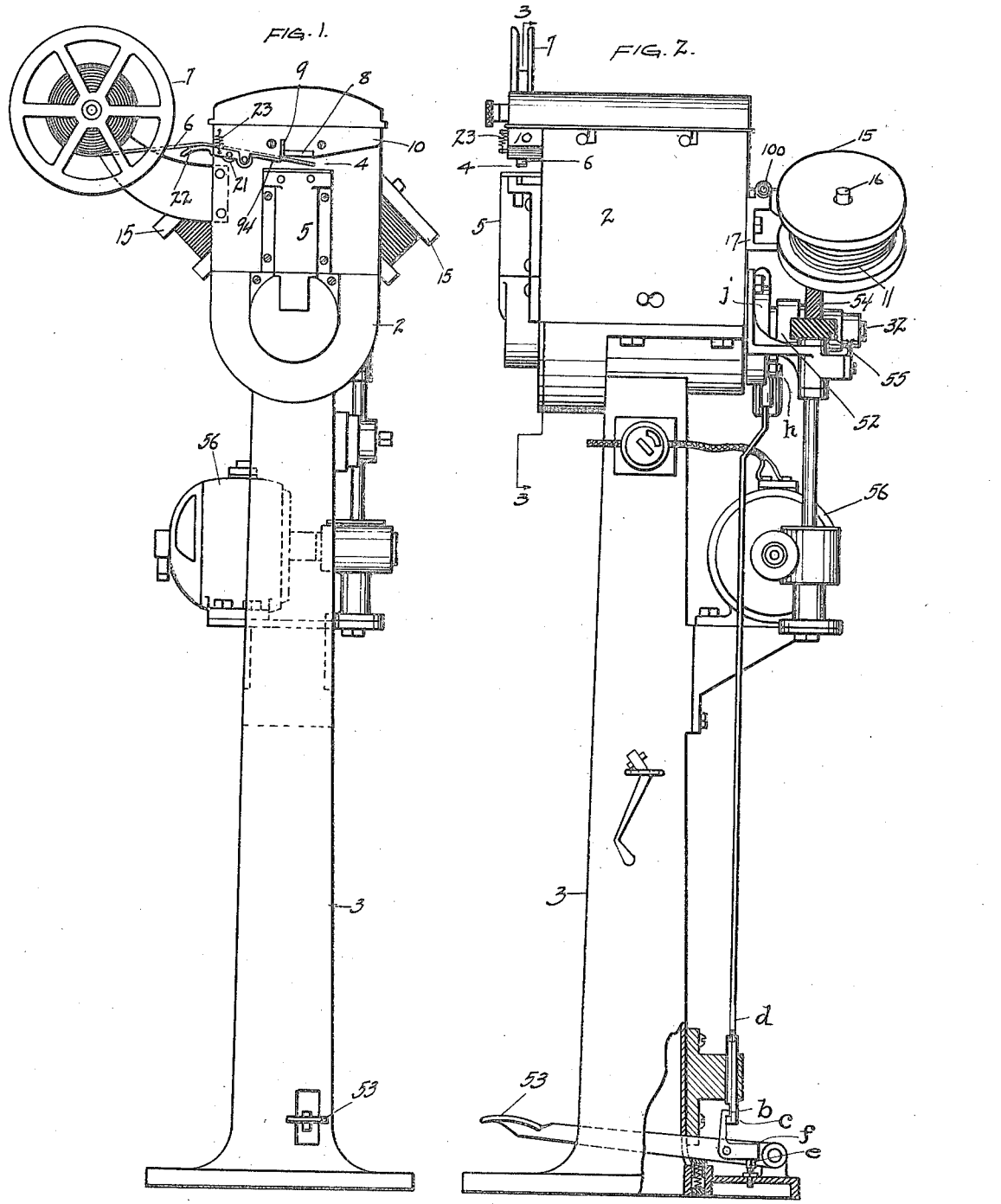

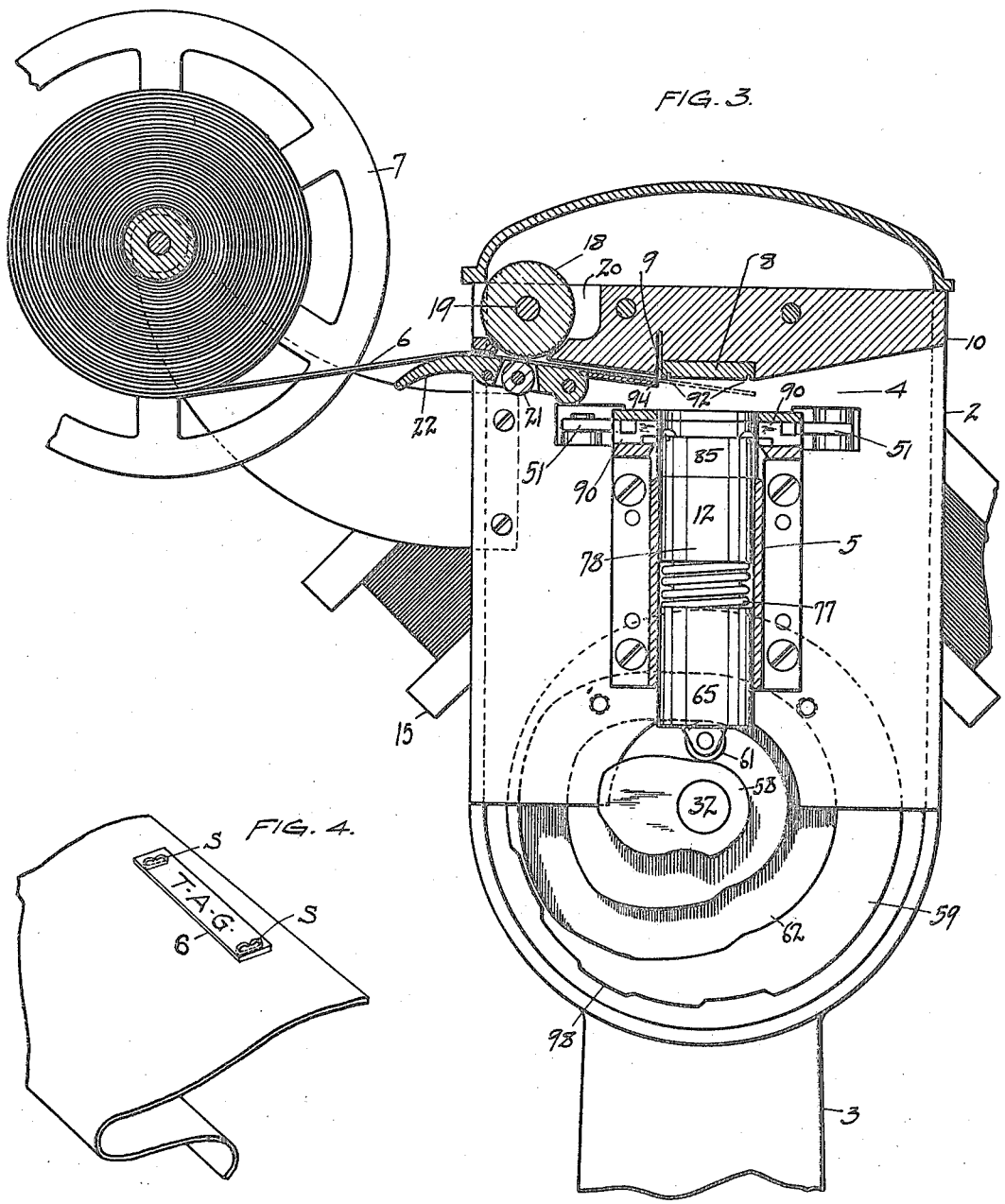

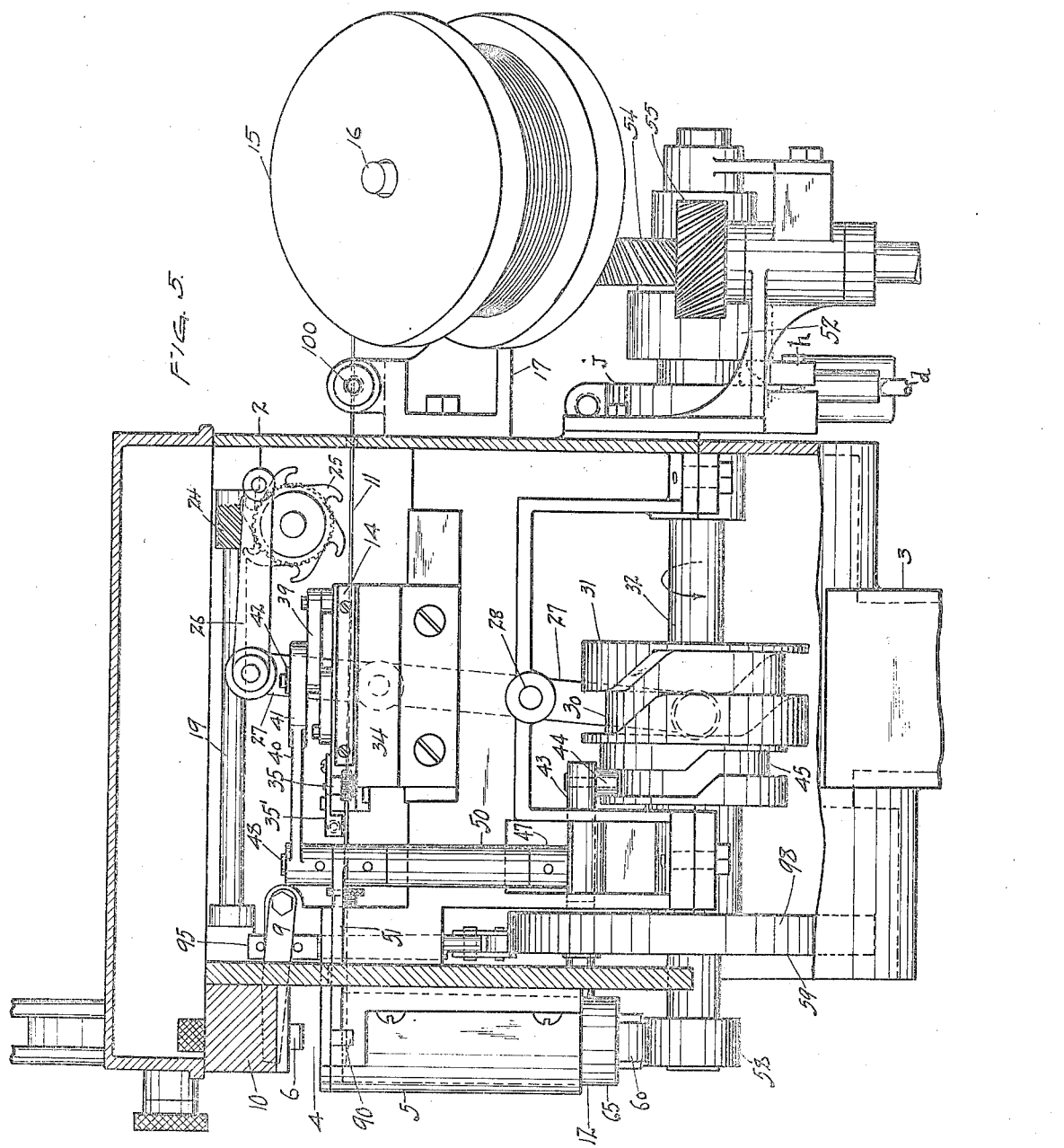

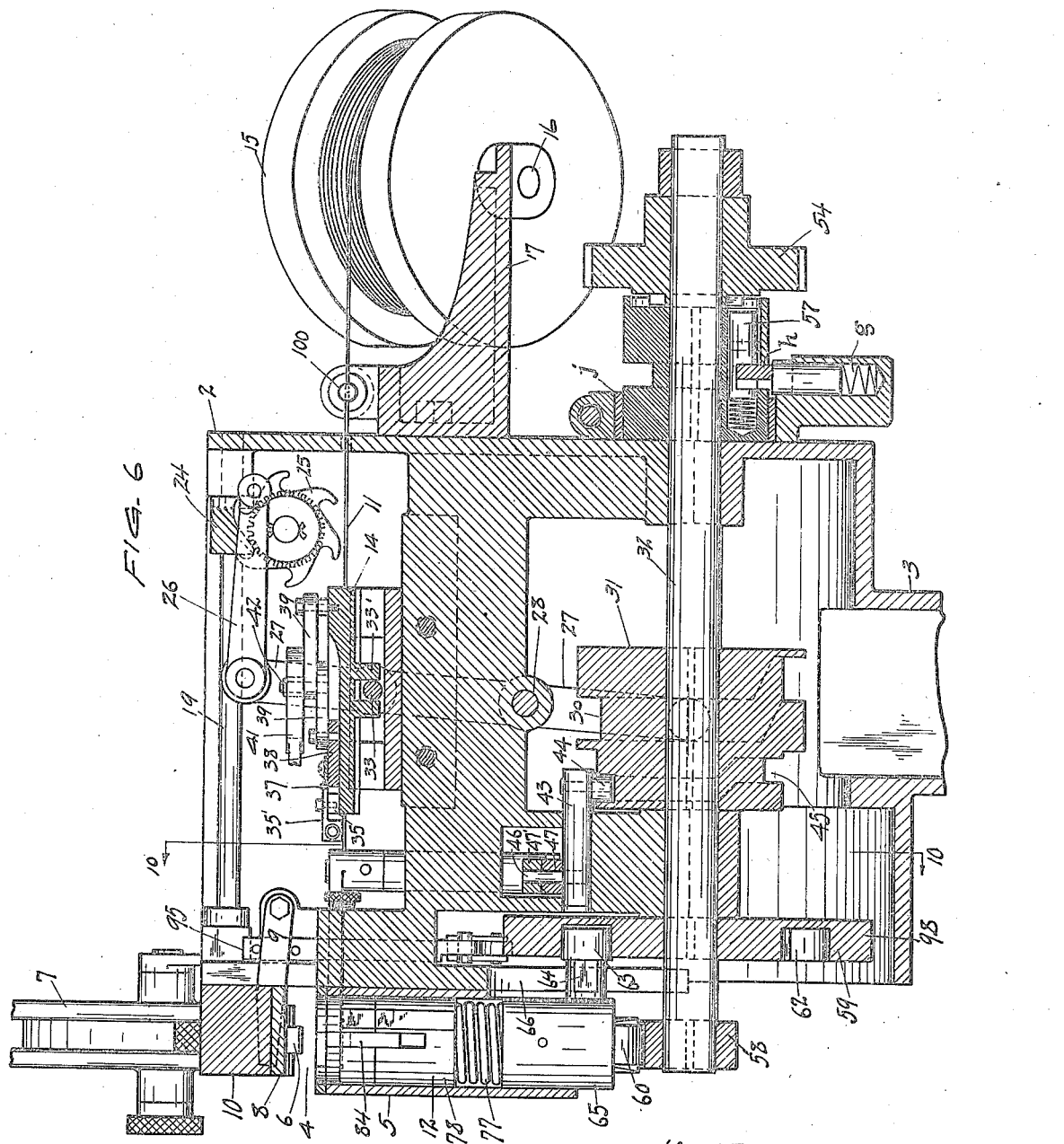

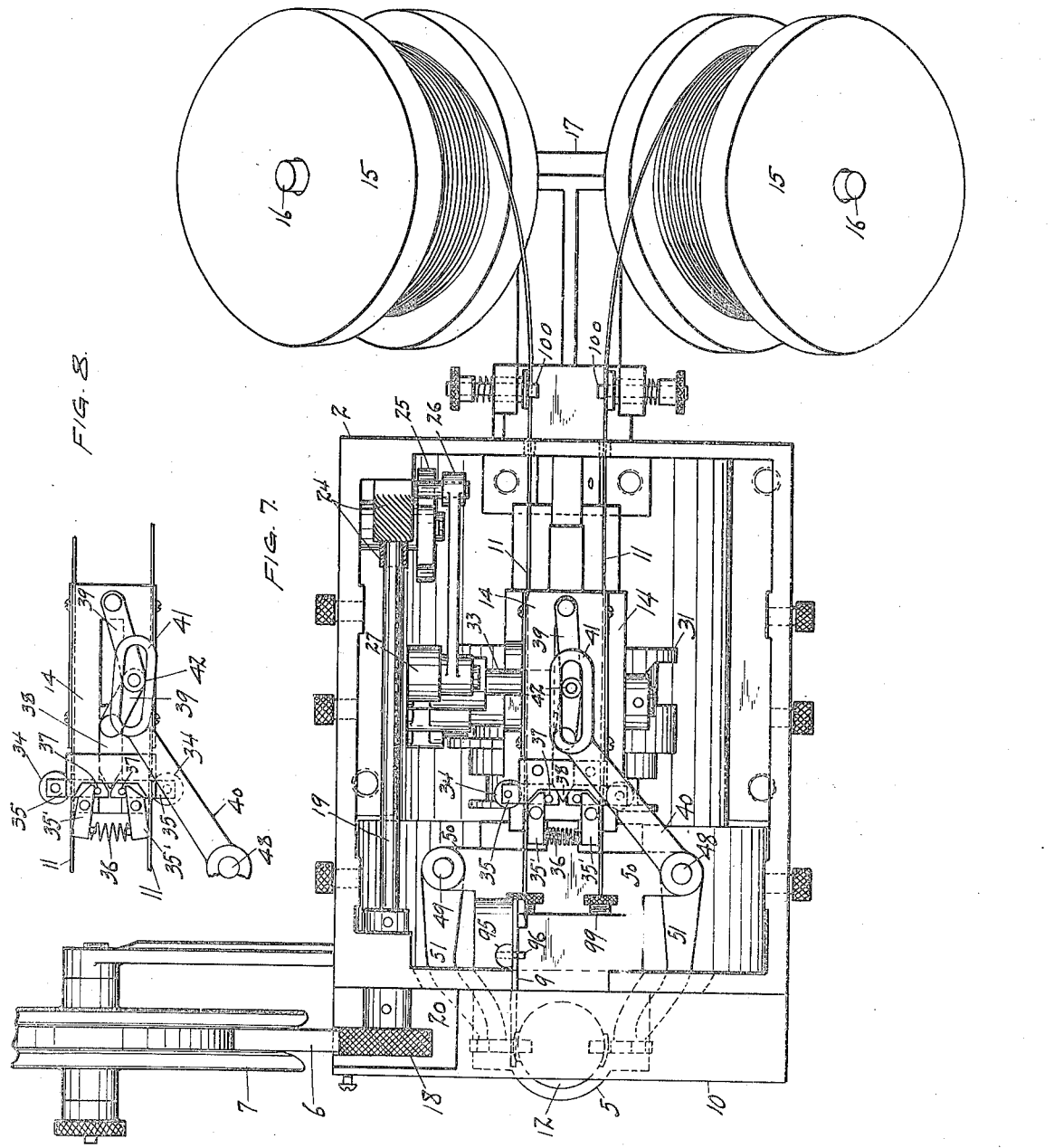

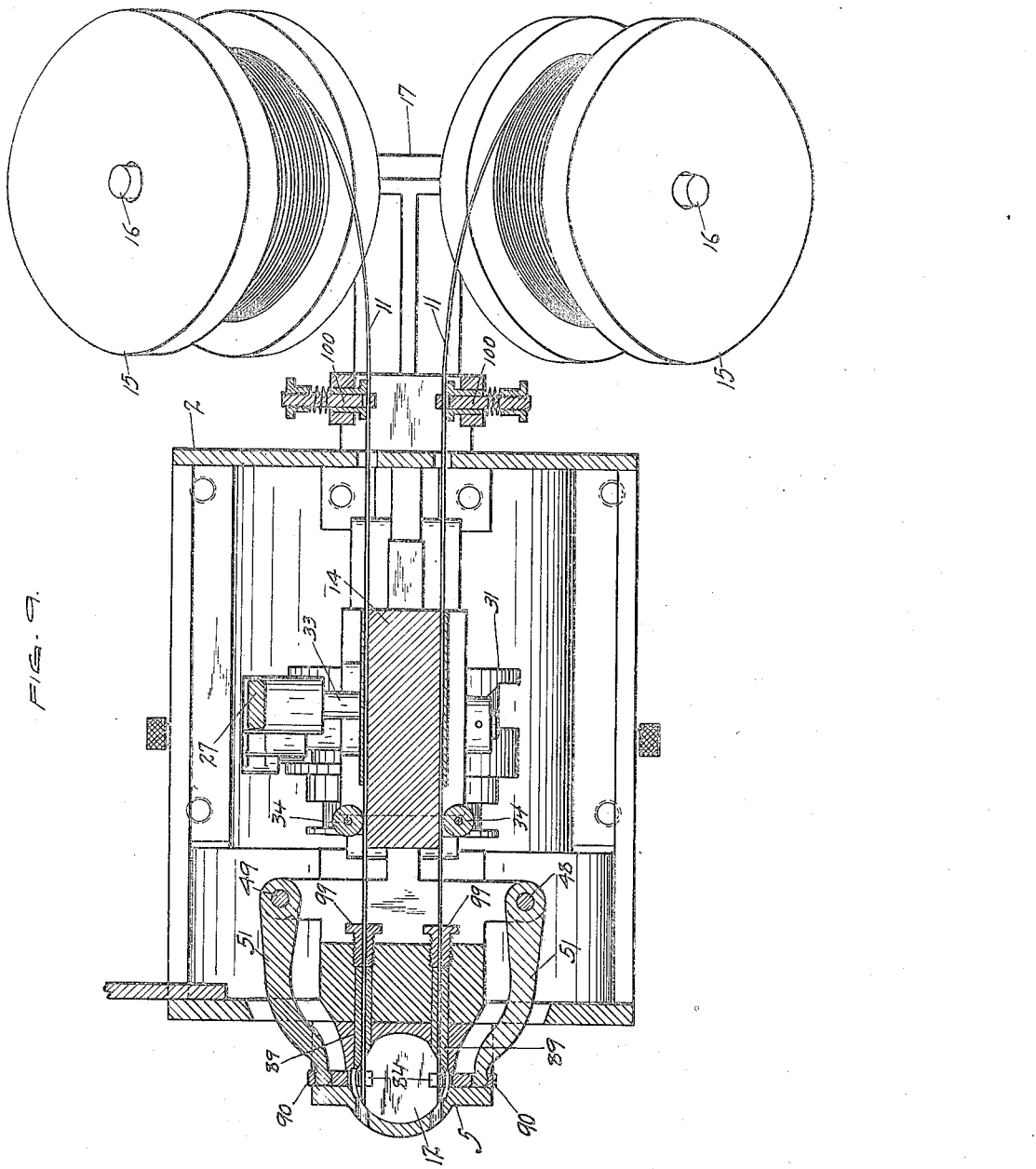

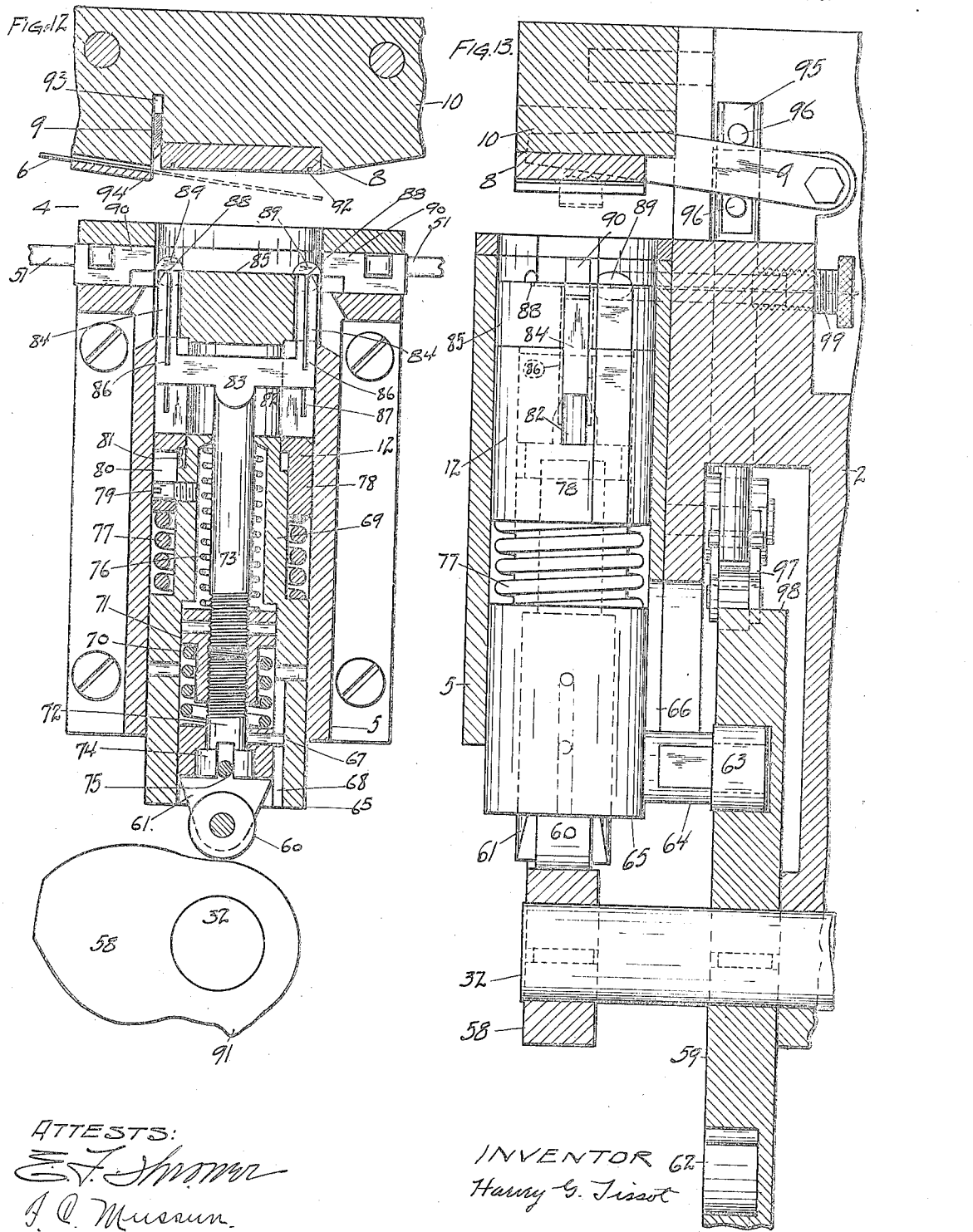

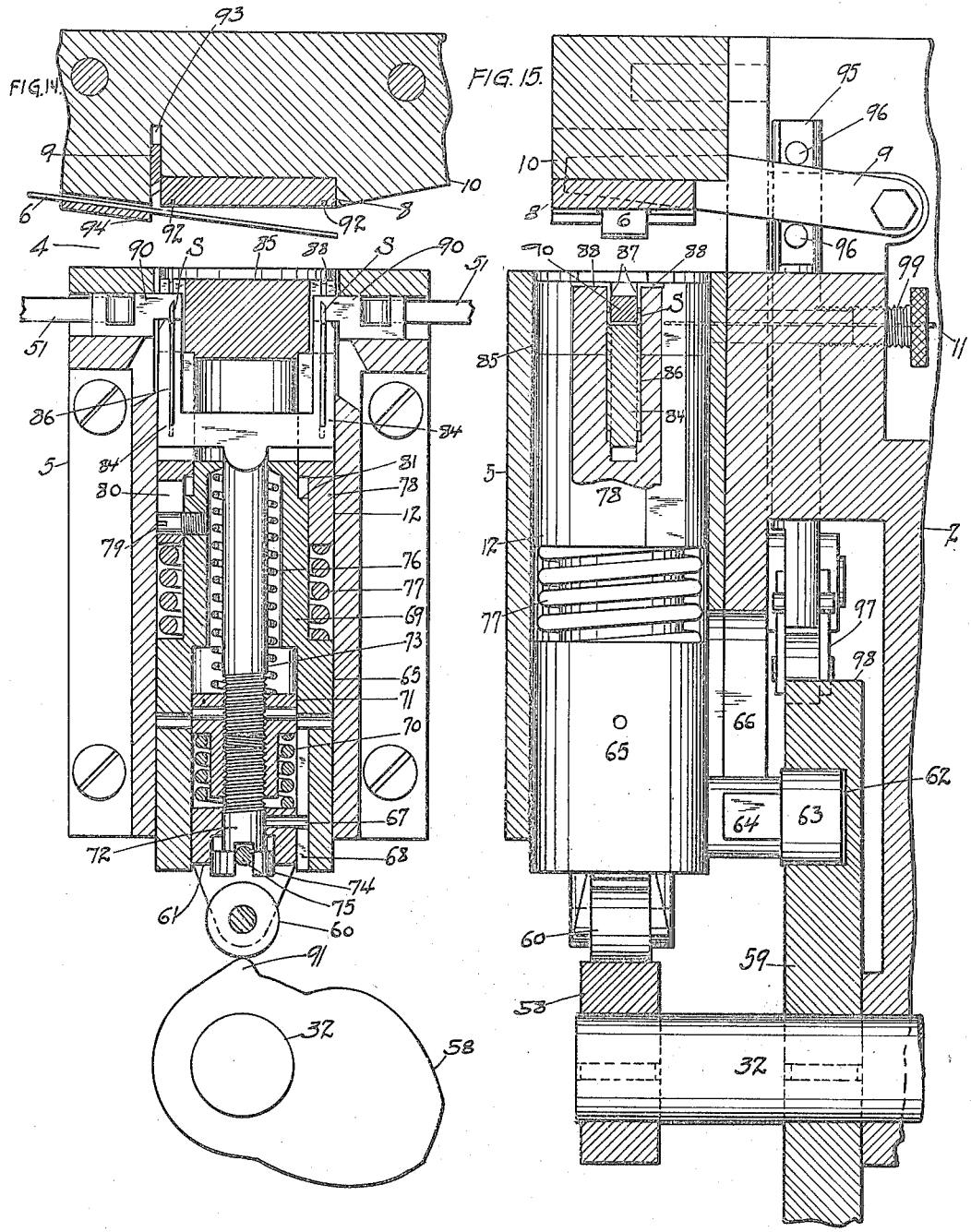

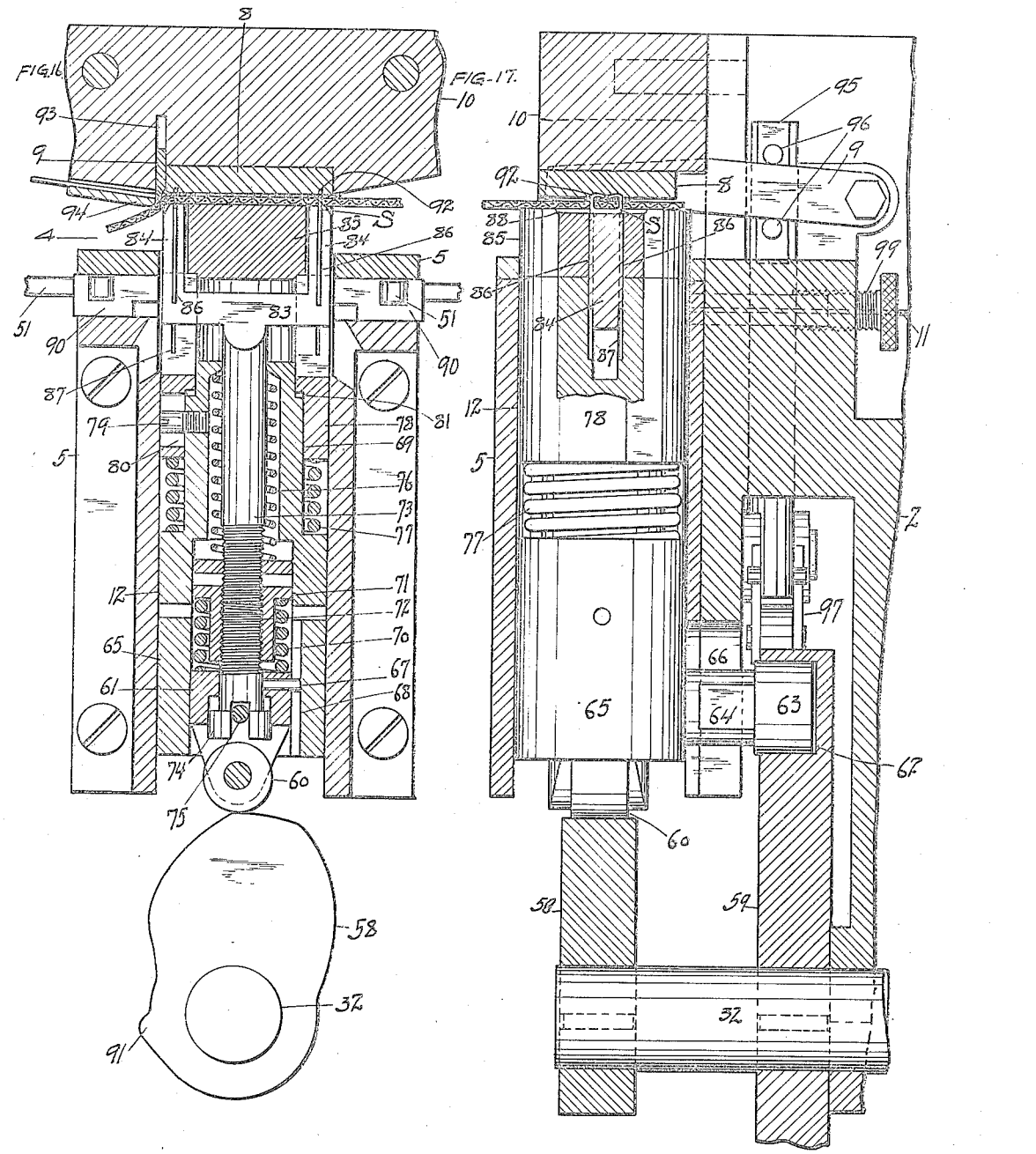

UNITED STATES PATENT OFFICE.

HARVEY G. TISSOT, OF CLEVELAND, OHIO, ASSIGNOR TO THE HALL MANUFACTURING COMPANY, OF CLEVELAND, OHIO, A CORPORATION OF OHIO.

TAGGING-MACHINE.

1,207,818.   Specification of Letters Patent.   Patented Dec. 12, 1916.

Application filed March 10, 1913. Serial No. 753,305.

*To all whom it may concern:*

Be it known that I, HARVEY G. TISSOT, a citizen of the United States, residing at Cleveland, in the county of Cuyahoga and State of Ohio, have invented certain new and useful Improvements in Tagging-Machines, of which the following is a specification.

This invention comprises a tagging machine, which is particularly constructed to clench a tag of cloth or other material upon a piece of goods by one or more wire staples with the tag subjacent to the clenched ends of the staple, whereby the attached tag will protect the goods from the staple ends and permit removal of the staple and tag without injury to the goods regardless of its fineness of texture. The machine is also particularly designed to feed the material for the tags and staples at intermittent intervals from reels, and to cut the material into predetermined lengths, as well as to form the staple and secure the tags therewith upon the goods in the relations as stated. To successfully accomplish the results desired the machine is compactly built with its working and fixed parts arranged and related substantially as herein shown and described and more particularly pointed out in the claims.

In the accompanying drawings, Figures 1 and 2 are front and side views, respectively, of the complete machine, on a reduced scale. Fig. 3 is a front view partly in section on line 3—3, Fig. 2, of the head of the machine, the scale being approximately one-half size. Fig. 4 is a perspective view of a piece of goods with a tag clenched thereon. Fig. 5 is a side elevation of the interior parts of the head looking in from the right of Fig. 3, the casing being partly removed and in section. Fig. 6 is a vertical section centrally of the head, looking in the same direction as in Fig. 5, the cap however being removed. Fig. 7 is a plan view of Fig. 6, and Fig. 8 is a detail view of the wire feeding device in gripping and feeding relation with the wires. Fig. 9 is a plan view in section of the machine on the line of the wires from which the staples are made. Fig. 10 is a cross section on line 10—10, Fig. 6, looking from the rear to the front, and Fig. 11 is a view on the same cross sectional line but looking in the opposite direction toward the rear and with the casing omitted. Fig. 12 is a front view in section, full size, of the tag cutting and staple forming and clenching devices at the front of the head, the various parts being in the position of rest assumed by them during the feeding of the wires, and Fig. 13 is a sectional view at right angles to Fig. 12 with the parts in the same relations. Figs. 14 and 15 are similar views to Figs. 12 and 13, except that the parts are shown at that point of their upward travel when the staples are actually completed, and Figs. 16 and 17 show the same parts in the final act of cutting off the tag and clenching it by the staples upon the goods.

The main operating parts of the machine are all practically housed in and supported by the head 2 at the top of a pedestal 3; and the mouth 4 of the machine where the goods is inserted is about waist-high or approximately three and one-half feet from the floor. The article to be tagged, say a piece of wearing apparel that is to be laundried and requires marking for identification, is placed within the mouth 4 in rest position upon the lower fixed jaw comprising a box 5 which is removably attached to the front of the head 2. The tag is cut from cloth tape 6 which is fed from a reel 7 into the upper part of the mouth 4, and the tag end of the tape projects over the goods beneath a die 8 and a pivoted knife 9 mounted at the bottom of an overhanging jaw 10 forming a fixed part of head 2. Reel 7 is removably mounted on a bracket at the side of head 2. The two staples for fastening the tag upon the goods are formed from two separate strands of wire 11—11 fed at intermittent intervals into the lower jaw 5. The wires are cut into predetermined lengths and formed into staples by the vertically reciprocable plunger 12 and its coöperating parts within box 5. The two wires 11 are fed forward at the same instant and in the same degree by a horizontally-reciprocable carrier located within head 2, see Figs. 7 and 8, and the wires are drawn through the rear of the head from the reels or spools 15 which are rotatably and removably supported upon the reversely-inclined pins 16 of the brackets 17 secured to the rear part of the head. The angular relations of the spools 15 permit the two wires to be fed relatively near together without kinking the wires and allow the spools to be removed without interfering with each other.

The feeding of the tape is concurrent with the feeding of the wires and is accomplished by a knurled wheel 18 (Fig. 3) which is fastened on the outer end of a horizontal shaft 19 having bearings within head 2. Wheel 18 occupies a recess 20 in the upper jaw 10 and co-acts with an idler roller 21 mounted on a pivoted lever 22 beneath the jaw. A spring 23 (Fig. 1) pulls upwardly upon the lever to promote feeding of the tape by the wheel and roller, and by pulling downwardly on the lever the parts may be widely separated to facilitate the placing of the tape therein. Shaft 19 is rotated intermittently by worm gears 24 and a ratchet wheel 25 when the latter is engaged by a forward movement of the pawl 26 and its operating lever 27, which lever, however, is rotatably supported between its ends on shaft 28 and provided with a roller 29 at its bottom end operating in cam groove 30 of the cam member 31 on main shaft 32, see Figs. 6 and 11. A forward movement of the upper end of lever 27 also moves the carrier 14 forward by a pin 33 projecting from the side of said lever and contacting with the two lugs 33' on the bottom of the carrier, and a pair of clutches 34 are also brought into action at this time to grip the wires 11 at opposite sides of the carrier, see Fig. 8. Clutches 34 comprise milled disks adjustably fixed against rotation on the outer ends and bottom side of two slides 35 alined transversely at the front end of the carrier, the disks being at the outer side of the wires to press the same against the sides of the carrier, Fig. 11. This occurs when the sides are forcibly carried toward each other by the pivoted dogs 35' and their interposed spring 36, see Fig. 8. The inner ends of the dogs engage upright pins 37 on the slides, and the opposed ends of the slides are beveled to co-act with the wedge end of a spreader member 38 which is mounted upon the carrier 14 but nevertheless independently reciprocable in respect thereto. It is only in the forward movement that the wires are tightly gripped, and the spreader member 38 is retired at this time by means of a pair of toggle links 39 and an oscillating arm 40 having a slotted extremity 41 engaged with a roller 42 mounted at the pivot joint between the links. Thus an oscillatory movement of arm 40 away from the median line of the carrier will retire the spreading member and also maintain it in this position if the arm is thereafter held stationary during the forward movement of the carrier, see Fig. 8. Upon a return movement of the carrier, the arm 40 is positioned as in Fig. 7, and the links are more nearly in line to force and hold the slides 35 apart by member 38 and to retire the clutches 34 from the wires. Oscillatory movements and stationary positions of arm 40 are obtained by a reciprocable rod 43 having a roller 44 operating in a cam groove 45 in cam member 31 or its equivalent, the said rod being slidably seated within a channeled web forming part of head 2 on a median line thereof and being operatively engaged by a pin 46 secured to the outer extremity of the lower arm 47 of a pair of such arms, see Fig. 10. The upper arm 47' has free-working engagement with pin 46, and is affixed to a rock shaft 48, whereas arm 47 is secured to a separate rock shaft 49 directly opposite. These shafts have their bearing in ears 50 at each side of the inner frame of head 2 and the arm 40 which is used to control the spreader member 38 for the clutches is affixed to the top of shaft 48. Each rock shaft is also provided with a forwardly-projecting arm 51 to co-act with the plunger 12 at timed intervals, as hereinafter explained.

The main shaft 32 extends through the bottom part of head 2 and beyond both the rear and front thereof, and is preferably power driven and under clutch control so as to make only a single revolution. Briefly, the shaft 32 has a clutch device 52 mounted thereon under control of a foot treadle 53 or other tripping member, whereby the shaft will be thrown into temporary power engagement with a gear 54 forming part of a train of gear or other power connections 55 leading to an electric motor 56 at the rear of pedestal 3. The power to rotate shaft 32 one revolution may be applied directly by foot or hand through any suitable treadle or lever connections in lieu of the motor and clutch and treadle connections as shown, but as shown the treadle 53 has a catch member $b$ pivotally mounted thereon to hook-engage the foot-end $c$ of trip rod $d$ when the treadle is in its highest position. The first downward movement of the treadle imparts a like movement to rod $d$ but in so doing the catch member $b$ is rotated on its pivot by the arresting action of a bolt $e$ standing in the path of the gravity arm $f$ of said member, thereby releasing the rod which is instantly moved upward by spring $g$ (Fig. 6) to throw the pivoted cam lever $h$ back into the annular groove $i$ of the revolving clutch body 52 and into the path of the notched clutch pin 57 to withdraw the same from its clutching relations with gear 54.

A friction band *j* about body 52 acts instantly to stop further revolution of the shaft 32 when the pin is withdrawn. Depression of treadle 53 lowers cam lever *h* and releases the spring-pressed pin 57.

The feeding of the tape and the wire occurs during an interval of rest of the plunger 12, and when feeding of the tape and wire is suspended the plunger and other parts perform their functions of cutting off the tape and wires into predetermined lengths and of forming and clenching the staples. Thus, the front end of shaft 32 carries two cams 58 and 59, respectively, the smaller one 58 being engaged at its periphery by a roller 60 mounted at the lower end of presser member 61 of plunger 12, and the larger one 59 having a cam groove 62 for a roller 63 which is mounted on the rearwardly-projecting pin 64 affixed to the lower body 65 of the plunger. Said pin 64 travels in a vertical slot 66 in the box 5 and head 2 and prevents rotation of the plunger, and member 61 is also prevented from rotating by a side pin 67 slidably confined in a vertical groove 68 upon the inside of the plunger body. This body 65 has a reduced top extension 69 and a differential bore, the lower and larger bore serving to slidably confine the presser member 61, a coiled spring 70, and a connecting part 71 for two screw-threaded bolts 72 and 73, respectively. Bolt 72 is relatively short and has a slotted head 74 socketed in presser member 61 to limit the outward play thereof under the expansion of the coiled spring 70. A cross pin 75 prevents a turning movement of the bolt but does not prevent member 61 from being pressed upward relatively to connecting part 71 at certain stages of operation. The upper smaller bore of body 65 holds a relatively long and light coil spring 76 which rests upon connecting part 71, and a heavy spring 77 is coiled around extension 69 and interposed between body 65 and its sleeve 78. A screw 79 in the side of body extension 69 extends into a slot 80 in the sleeve and limits said sleeve in its upward movement relatively to body 65. Shoulders 81 on extension 69 and sleeve 78 limit the upward movement of body 65 in respect to said sleeve. The upper end of sleeve 78 has side slots to slidably confine the forked head 83 of bolt 73, and particularly the upwardly-projecting fingers 84 of this head; and these slots extend upwardly through the cap or head 85 to the extreme top thereof. The meeting faces of these fingers and the side slots are respectively provided with narrow ribs 86 and corresponding grooves 87 lengthwise thereof which register at their top ends with horizontal grooves 88 in the top face of the plunger cap 85. When the plunger 12 is down the top grooves 88 are horizontally in line with the central openings of the two shearing feed tubes 89 for the wires 11, and when the wires are fed forward the projecting ends of the wires span the grooved tops of the fingers, see Fig. 9. Shearing of the wires is at an angle to the axis thereof to produce a point and is effected by an upward movement of the plunger, the ends of the tubes 89 and the sides of the plunger cap 85 being formed to provide co-acting cutting edges at alternate angles. It is necessary however to temporarily hold the wire against upward movement during shearing steps and particularly during staple-forming operations, and a pair of horizontally-reciprocable formers 90 are used for this purpose, these formers being mounted diametrically opposite each other in box 5 in line with fingers 84. The formers 90 are reciprocated by the oscillatory arms 51 heretofore described, and Fig. 12 shows them in a retired position, whereas Fig. 14 shows them projected inwardly over the ends of fingers 84 and with the staples S fully formed. Shearing of the wires and forming of the staples is the result of an initial lift movement of the plunger 12 by cam 59 and roller 63, and during this movement the upper ends of both fingers 84 are pressed tightly against the overlying ends of the formers 90, this result being produced by the upward pressure of spring 70 when the small projection 91 on cam 58 raises roller 60 and the presser member 61, see Fig. 14. The legs of the staples are formed from the ends of the cut pieces of wire, being taken from the horizontal grooves 88 in the top face of cap 85 and bent upwardly into the vertical grooves 87 at opposite sides of formers 90 when the plunger is raised. Then as roller 60 rides free of cam projection 91 the formers 90 are released from fingers 84 and the arms 51 withdraw them entirely, whereupon the cam 58 raises the presser member 61 and the fingers 84 concurrently with the plunger 12 which derives its movement from cam 59.

The end of the tape 6 which provides the tag extends over the upper end of the plunger, and the final upward movement of the plunger presses the goods to be tagged against the tape and the latter against the bottom of the die plate 8, the coiled spring 77 taking up any differential movement in the parts and promoting effective clenching results. The bolt 73 and its fingers 84 however continue their upward movement when the plunger is arrested, thereby raising the staples from their seated position in the grooves 86 in the cap and projecting the pointed ends thereof through the goods and then through the tape against the die plate 8 which has curved deflecting recesses 92 adapted to clench the ends of the staples back upon the tape, see Fig. 17. Clenching operations by the fingers 84 are subject to the cushioning effects of spring 70, and this spring as well as spring 77 permits successful clenching operations on goods of different thicknesses. The spring 76 presses bolt 73 downward to retire the fingers 84 within the cap 85 upon a downward movement of the plunger.

The cutting of tape 6 by knife 9 also occurs during clenching operations, Fig. 16. This knife 9 works in a vertical slot 93 in jaw 10 at the left of die plate 8 and it has a beveled cutting edge with the beveled side facing the die plate and its flat side bearing against the depending portion 94 of the jaw having the guide passage for the tape. The portion 94 is projected to a lower level than the bottom of the die plate so that the knife may cut through the tape but not into the goods which is only exposed to the bevel of the knife and not to its cutting edge. In other words, the cutting edge of the knife does not come below the rounded edge of jaw portion 94, see Fig. 16. The means for operating the pivoted knife 9 at timed intervals comprises a vertically-movable rod 95 mounted within head 2 and having engaging pins 96 for the knife, and which rod is actuated by a bell crank 97 having roller engagement with the peripheral cam surface 98 of cam 59, see Figs. 10 and 17.

The shearing tubes 89 for wires 11 are backed by thumb screws 99 which are used to adjustably fix the cutting ends of the tubes in respect to the cutting faces of the plunger, and the wires 11 are frictionally engaged at the rear of head 2 by spring pressed bolts 100 to prevent a back movement of the wires and to straighten the wires if kinked.

What I claim is:

1. In a tagging machine, a staple-forming plunger having wire-shearing edges, and means to feed wire to said plunger, in combination with a stationary staple-clenching device above said plunger, and means to feed tagging material to said device at a point apart from said plunger to permit the goods to enter between the plunger and the tagging material.

2. In a tagging machine, a fixed and a movable staple-clenching member, means to feed staple forming wire in a horizontal plane to one of said members and means to feed tagging material to the other member transversely to the feed of said wire, and separate shearing devices for the wire and the tagging material respectively, in combination with means co-acting with the said movable clenching member to form a staple preparatory to clenching the same against the other member.

3. In a tagging machine, a stationary staple-clenching member, a sectional plunger vertically disposed beneath said member, a spring adapted to provide differential movements in the sections of said plunger and devices co-acting with said plunger to form staples and project the same from the end of the plunger, in combination with separate means adapted to feed wire and tagging material respectively at right angles to each other but on different horizontal planes across the exposed end of said plunger.

4. In a tagging machine, a stationary staple-clenching member, a wire-shearing plunger adapted to cut a plurality of staple wires at separate points opposite the ends of said clenching member at one stroke, a cushioning spring for said plunger, devices to co-act with said plunger to form staples and push members adapted to project the finished staples against said clenching member, in combination with means to feed wire in a horizontal plane to said plunger, means to feed tagging material downwardly and transversely between said plunger and said clenching device, and means to sever said tagging material into predetermined lengths conjointly with the clenching of the staples.

5. In a tagging machine, a fixed jaw having a transverse passage for a piece of tape and feeding mechanism therewith, and an entrance for the goods alined with and beneath said passage, a staple-clenching die plate mounted in inverted position adjacent said passage, substantially in line with said mechanism, a knife transversely of said passage and a projecting portion on said jaw opposite the cutting edge of said knife, in combination with a plunger and co-acting devices to lift and press the goods against the tape and to force a staple through the goods and tape successively against the said die plate.

6. In a tagging machine, an inverted jaw having a die plate and a depending part at one side thereof provided with a channel to guide the tagging material beneath said die plate, and means to feed a piece of said material through said channel and said machine having an entrance for the goods beneath said depending part, in combination with a knife between said die plate and said depending part and means to operate said knife at predetermined intervals to sever said material into uniform lengths.

7. In a tagging machine, a pedestal having a protruding jaw provided with a stationary staple-clenching member mounted in an inverted position thereon, a tape-cutting device and a tape-feeding device mounted in juxtaposition on the underside of said jaw, in combination with a reciprocable plunger, reciprocable formers for the staples at the side of said plunger and reciprocable push members and means to impart variable movements to said parts to conjointly form and project staples upwardly against the said clenching device.

8. In a tagging machine, means to feed a tag upon one side of a piece of goods, in combination with means to force a plural number of staples first through the goods and then through opposite ends of the tag, and means to clench the ends of all the staples upon the tag.

In testimony whereof I affix my signature in presence of two witnesses.

HARVEY G. TISSOT.

Witnesses:
R. B. MOSER,
S. C. MUSSUN.